May 15, 1934.　　　　H. C. FIEGE　　　　1,958,748

CABLE CLAMP

Filed Sept. 12, 1932

INVENTOR.
H. C. Fiege
BY
Morsell, Lieber & Morsell
ATTORNEYS.

Patented May 15, 1934

1,958,748

UNITED STATES PATENT OFFICE 1,958,748

CABLE CLAMP

Henry C. Fiege, Green Bay, Wis.

Application September 12, 1932, Serial No. 632,677

9 Claims. (Cl. 24—126)

The present invention relates to improvements in the construction and operation of apparatus for clamping elongated elements or portions of elements such as cables, to each other.

Generally defined, an object of the invention is to provide an improved clamping device for elongated elements such as cables, which is simple and compact in construction, and which is moreover highly efficient in operation.

Some of the more specific objects of the invention are as follows:

To provide a new and useful cable clamp of relatively light but durable construction, which may be readily assembled by a single individual.

To provide an improved clamp fitting which will positively eliminate slippage of the connected elements, and wherein the relative disposition of the clamped element portions is constantly visible.

To provide a clamping mechanism for cables or the like, which may be rapidly and effectively tightened or released by manipulation of a minimum number of parts, and with the aid of standard tools.

To provide an improved clamping device especially adapted for the formation of a loop at the end of a wire or cable, which is especially useful for application of insulators to electrical transmission lines or to cable supports and guys for such lines.

To provide an improved clamp assemblage which is particularly useful in repairing ruptures or breaks in wires or cables, and which comprises a minimum number of parts.

To provide an effective clamp structure of neat appearance, which when properly applied eliminates exposure of loose or frayed ends of the clamped elements.

To provide a clamp which may be assembled and effectively permanently applied to cables or the like, without utilizing molten metal or the like.

To provide an improved cable clamp of extremely simple construction which meets all of the various safety requirements of engineering societies and of the states and nations.

To provide various improvements in wire or rope clamp fittings whereby such devices may be manufactured at minimum cost, and will possess maximum utility.

These and other objects and advantages of the invention will be apparent from the following detailed description.

A clear conception of an embodiment of the invention and of the mode of constructing and of utilizing cable clamps built in accordance therewith, may be had by referring to the drawing accompanying and forming a part of this specification in which like reference characters designate the same or similar parts in the various views.

While the invention has been shown and described herein as being specifically incorporated in a cable clamp especially adapted for the formation of a loop at the end of a metallic wire cable, it will be apparent that some of the features of the improvement are more generally applicable to clamps for directly connecting several elongated elements or portions of the same element, of any kind, and the scope of the invention should not be unnecessarily restricted because of the specific disclosure.

Figure 2:
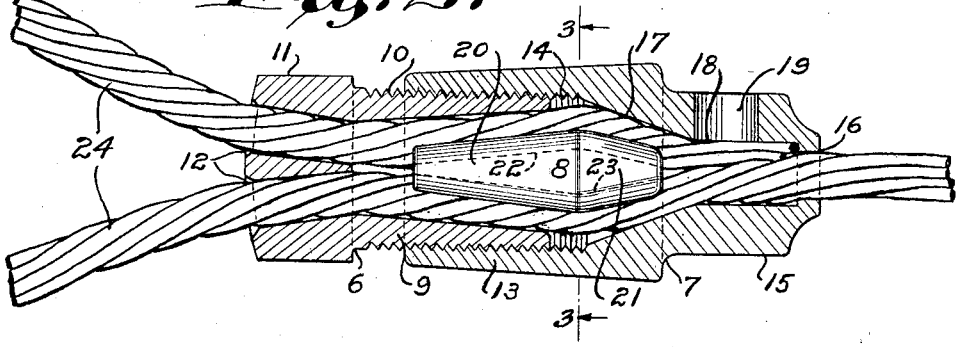
Fig. 2 is an enlarged central longitudinal section through the improved clamp showing the cable applied therein.
Figure 3:
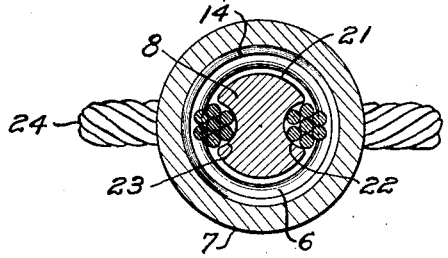
Fig. 3 is a similarly enlarged transverse section through the clamp and cable, taken along the line 3—3 of Fig. 2.
Figure 4:
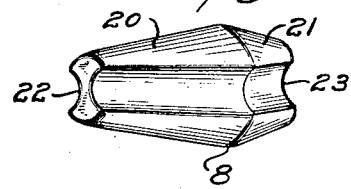
Fig. 4 is a perspective view of the wedge member or block constituting part of the clamp.

The improved cable loop clamp shown in detail in Figs. 2, 3 and 4 of the drawing, comprises in general a pair of direct coacting longitudinally shiftable tubular clamping members 6, 7 and an inner clamping element or block 8 cooperating with said tubular members.

The clamping member 6 has a tubular portion 9 of considerable length provided with external screw threads 10 and with an internal gradually tapered bore, and has a polygonal head 11 provided with a pair of slightly divergent holes 12 therethrough communicating with the smaller end of the tapered bore of the externally threaded tubular portion 9, in the manner illustrated in Fig. 2.

The clamping member 7 has a tubular portion 13 of considerable length embracing the tubular portion 9 of the member 6, and provided with internal screw threads 14 cooperable with the screw threads 10 of the member 6, to longitudinally relatively move the members 6, 7. The end portion 15 of the member 7 is polygonal in shape and is provided with a central end hole 16, and the medial portion of the member 7 has an abruptly tapered internal wedging bore 17 connected at its smaller end with the hole 16 by means of a slightly enlarged cylindrical bore 18.

The end member portion 15 is moreover provided with a lateral sight opening 19 communicating with the cylindrical bore 18 near the end of the tapered bore 17.

The inner clamping element or block 8 has oppositely tapered outer surfaces 20, 21 meeting at the medial portion thereof, and is provided with a pair of oppositely relatively tapered side grooves 22, 23 extending from end to end thereof. The formation of the block 8 is substantially as shown in Figs. 2 and 4, and the inclined portions of the grooves 22, 23 are cooperable with the tapered bores of the members 6, 7 to clamp a cable 24 in position as shown in Fig. 2, upon relative longitudinal movement of the members 6, 7.

Figure 1:
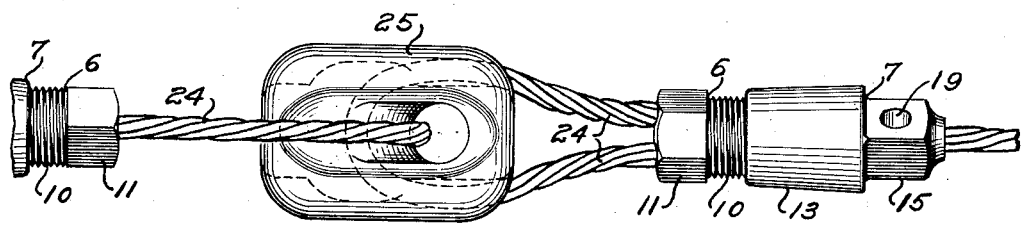
Fig. 1 is a side elevation of an assembled cable clamp applied to the looped end of a cable, coacting with a standard electrical insulator.

In Fig. 1, the improved clamping device has been shown applied for the insertion of a standard electrical insulating block 25 between the adjacent looped ends of two sections of cable 24. The oppositely looped ends of the cables coact with transversely extending openings through the insulator 25 and the clamping devices are applied to the individual cables 24 to form the loops.

In applying the improved clamping device to a cable 24, the cable is first passed through one of the end openings 12 in the member 6 and is bent to form the loop whereupon the end of the cable is passed through the other end opening 12 so as to lie adjacent the portion of the cable extending away from the member 6 through the tubular portion 9 thereof. The clamping element or block 8 is then inserted between the cable sections with the tapered surfaces 20 extending into the taper bore of the tubular portion 9 of the member 6. The clamping member 7 which has previously been slipped over the cable 24 prior to the initial formation of the loop, is then pushed over the end of the cable and the screw threads 14 of the member 7 are brought into engagement with the screw threads 10 of the member 6. Upon relative rotation of the members 6, 7, the member 7 will be advanced along the tubular portion 10 of the member 6, eventually bringing the tapered bore 17 into clamping contact with the cable portions on opposite sides of the block 8 and also forcing the cable portions into snug engagement with the internal bore of the tubular portion 9 and with the oppositely inclined portions of the block grooves, until the cable 24 is clamped firmly into position. In order to secure final clamping, it is necessary to apply wrenches to the polygonal portions 11, 15 of the members 6, 7 and when the final clamping has been effected, the end of the cable will be brought into firm engagement with the cylindrical bore 18 and will be held firmly and snugly against the portion of the cable 24 which extends away from the clamping device through the opening 16. The sight opening 19 affords means for determining whether or not the cable end has been properly positioned and clamped, and this sight opening is left open at all times and does not interfere with the application of a wrench to the polygonal portion 15.

From the foregoing description it will be apparent that the improved clamp comprising only three parts provides means for effectively looping the end of a cable 24 with the aid of standard tools and by a single individual. The wedge block 8 serves to firmly clamp the adjacent cable portions between the relatively inclined grooves 22, 23 and the tapered bores of the members 6, 7 and if it becomes desirable to release the clamping effect this may be readily done by merely withdrawing the member 7 from the member 6. The relatively inclined openings 12 serve to retain the loop in position during clamping and prevent displacement of the cable relative to the member 6. These openings 12 cooperating with the central opening 16 in the member 7, moreover produce a neat appearing loop without undesirably kinking the cable, and the tubular formation of the members 6, 7 prevents unsightly exposure of the frayed ends of the cable 24 after final clamping has been effected. The improved clamp moreover insures thorough clamping without the use of molten metals, and the device has proven extremely efficient in commercial operation.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. A cable clamp comprising, a pair of relatively movable coacting clamping members, one of said members having a pair of holes and the other member having a single central hole in the ends thereof, a wedging element disposed within said members and having a pair of wedge grooves alineable with said holes and cooperable with a surface of the other member to wedge a cable extending through said central hole and looped through said pair of holes between said element and one of said members, and means in one of said members for receiving and concealing the free end of the cable.

2. A cable clamp comprising, a clamping member having a tubular portion provided with screw threads and having a pair of end holes communicating with the interior thereof, a second clamping member having screw thread coaction with the screw threads of said first mentioned member and having a tapered bore and an end hole communicating with said bore, and a wedging element disposed within said members and cooperable with said bore to wedge a cable extending through said central hole and looped through said pair of holes between said element and said bore, said bore being formed adjacent the end hole to receive and conceal the free end of the cable adjacent the entering end thereof.

3. A cable clamp comprising, a clamping member having a tubular portion provided with screw threads and having a pair of end holes communicating with the interior thereof, a second clamping member having screw thread coaction with the screw threads of said first mentioned member and having a tapered bore and an end hole communicating with said bore, and a wedging element disposed within said members and having a pair of wedge grooves alineable with said pair of end holes and cooperable with said bore to wedge a cable extending through said central hole and looped through said pair of holes between said element and said bore, said bore being formed adjacent the end hole to receive and conceal the free end of the cable adjacent the entering end thereof.

4. A cable clamp comprising, a clamping member having a pair of divergent end openings formed to receive the loop ends of a cable, a second clamping member adjustable toward said first mentioned member and having a tapered bore, and an element located between said members and having opposite relatively tapered grooves cooperable with said bore to clamp the cable end and a portion of the cable remote from said end against displacement longitudinally of said members.

5. A cable clamp comprising a clamping member having a pair of divergent end openings formed to receive the loop ends of a cable, a second clamping member adjustable toward said first mentioned member and having a tapered bore, and an element located between said members and having opposite relatively tapered grooves cooperable with said bore to clamp the cable end and a portion of the cable remote from said end against displacement longitudinally of said members, said second member having a lateral sight opening adjacent to said bore.

6. A cable clamp comprising, a pair of relatively movable coacting clamping members, and a wedging element disposed within and coacting with one of said members to maintain a loop adjacent the end of a cable with the free end of the cable in a particular position within the device, one of said members having a lateral sight opening positioned to permit view of said free end only when it is in the required position.

7. A cable clamp comprising, a clamping member having a pair of divergent end openings formed to receive the loop ends of a cable, a second clamping member adjustable toward said first-mentioned member and having a tapered bore, and an element located between said members and cooperable with the bore to clamp the cable end and a portion of the cable remote from said end aaginst displacement longitudinally of said members, said second member having a lateral sight opening adjacent said bore.

8. A cable clamp comprising, a pair of relatively movable coacting tubular clamping members, a wedging element disposed within said members and coacting with the interior thereof to clamp a cable which enters at one end of the device and which forms a loop exteriorly of the other end of the device and to hold the cable in said loop formation, one of said members being formed with means for receiving and concealing the free end of the cable.

9. A cable clamp comprising, a clamping member having a bore communicating with each end thereof, a second clamping member having an entrance hole of a size to receive a single cable and having an enlarged bore adjacent said entrance hole communicating with the other end of the member, said clamping members being formed to adjustably engage one another, and a wedging element disposed within said members and coacting with the bores thereof to clamp a cable which enters the entrance hole and which forms a loop exteriorly of the other end of the device and to hold said cable in looped formation, the enlarged bore portion of the second-mentioned clamping member adjacent the entrance hole being of a size to receive and hold the free end of the cable adjacent the entering portion of said cable.

HENRY C. FIEGE.